(12) United States Patent
Anderson et al.

(10) Patent No.: US 7,224,963 B2
(45) Date of Patent: May 29, 2007

(54) SYSTEM METHOD AND COMPUTER PROGRAM PRODUCT FOR MANAGING THEMES IN A MOBILE PHONE

(75) Inventors: Keith W. Anderson, Durham, NC (US); Christopher J. Sheely, Lexington, SC (US)

(73) Assignee: Sony Ericsson Mobile Communications AB, Lund (SE)

( * ) Notice: Subject to any disclaimer, the term of this patent is extended or adjusted under 35 U.S.C. 154(b) by 438 days.

(21) Appl. No.: 10/605,686

(22) Filed: Oct. 17, 2003

(65) Prior Publication Data

US 2005/0085272 A1   Apr. 21, 2005

(51) Int. Cl.
H04M 11/10    (2006.01)
(52) U.S. Cl. .............................. 455/414.3; 455/456.3; 379/88.24; 340/539.13
(58) Field of Classification Search ............... 379/67.1, 379/88.22–88.24; 455/412.1, 412.2, 413, 455/414.1–4, 456.1, 456.2, 456.3, 456.5–7, 455/456.6; 340/988, 993, 994, 539.1, 539.11, 340/539.13
See application file for complete search history.

(56) References Cited

U.S. PATENT DOCUMENTS

| | | | |
|---|---|---|---|
| 6,834,195 B2 * | 12/2004 | Brandenberg et al. ... | 455/456.3 |
| 6,901,437 B1 * | 5/2005 | Li .............................. | 709/219 |
| 2002/0132610 A1 | 9/2002 | Chaplin et al. | |
| 2002/0142792 A1 | 10/2002 | Martinez | |
| 2003/0006912 A1 * | 1/2003 | Brescia ........................ | 340/990 |
| 2003/0008661 A1 * | 1/2003 | Joyce et al. ................. | 455/456 |
| 2003/0186729 A1 | 10/2003 | Engstrom et al. | |
| 2004/0022369 A1 * | 2/2004 | Vitikainen et al. ......... | 379/67.1 |

FOREIGN PATENT DOCUMENTS

| | | |
|---|---|---|
| EP | 1396984 | 3/2004 |
| GB | 2386510 | 9/2003 |

OTHER PUBLICATIONS

International Search Report, PCT/IB2004/001858, Sony Ericsson Mobile Communications AB, Sep. 29, 2004.
Written Opinion, PCT/IB2004/001858, Sony Ericsson Mobile Communications AB, Sep. 29, 2004.
Sony Ericsson Mobile Communications AB, "International Patent Application Ser. No. PCT/IB2004/001858", *International Preliminary Report On Patentability*, Nov. 24, 2005.

* cited by examiner

*Primary Examiner*—Nguyen T. Vo
*Assistant Examiner*—Nhan T. Le
(74) *Attorney, Agent, or Firm*—Moore & Van Allen PLLC; Gregory A. Stephens (57) ABSTRACT

Themes provide the mobile phone with changeable characteristics pertaining to the appearance and sound presented by the mobile phone. A theme profile associated with the mobile phone contains data pertaining to which theme to apply to the mobile phone and when to transition to another theme as well as where theme content data is located. The mobile phone then waits for a triggering event to occur. When such a triggering event occurs, it causes a transition from the currently active theme to another theme. A new theme based on an associated triggering event is applied to the mobile phone changing its look and feel.

39 Claims, 5 Drawing Sheets

THEME PROFILE: {DEFAULT THEME :Triggering Event; Priority; Duration; Pointer to Content Data,
THEME 2:Triggering Event; Priority; Duration; Pointer to Content Data,
THEME 3:Triggering Event; Priority; Duration; Pointer to Content Data,
THEME n:Triggering Event; Priority; Duration; Pointer to Content Data}

TRIGGERING EVENT: {Time Based; Location Based; Event Based}

CONTENT DATA: {Display Characteristics; Ringtones; Ringtone Characteristics; Requests for Data; Rules of Application}

SYSTEM METHOD AND COMPUTER PROGRAM PRODUCT FOR MANAGING THEMES IN A MOBILE PHONE

BACKGROUND OF INVENTION

Mobile phones today include sophisticated hardware and software designed to enhance the user experience. Unfortunately, there is still a lack of exciting content to fully exploit the mobile phone's capabilities. Most mobile phones allow a user to individually set backgrounds, wallpapers, and ringtones. One manufacturer, Sony Ericsson, has even taken this a step further and bundled backgrounds, wallpapers, and ringtones into themes that can be set as a group in a single action. Themes give the mobile phone an overall character. A theme remains active on a mobile phone until the user deactivates the theme or changes to another theme.

SUMMARY OF INVENTION

The present invention facilitates managing themes that are associated with the look and feel of a mobile phone. Themes provide the mobile phone with changeable characteristics pertaining to the appearance and sound presented by the mobile phone. A theme profile associated with the mobile phone determines which theme is currently active. The mobile phone then waits for a triggering event to occur to cause a transition from the currently active theme to another theme. When the triggering event occurs, a new theme based on an associated triggering event is applied to the mobile phone changing its look and feel.

A theme profile primarily includes three types of data. The first is data pertaining to triggering events that cause the mobile phone to transition from one theme to another theme. The second is a set of rules that determine which theme shall be applied to the mobile phone in the event of conflicting triggering events. The third type of data in the theme profile is information about the theme content itself, i.e. wallpapers, ringtones, screen savers, etc.

The theme profile associated with the mobile phone can be stored locally on the mobile phone or it can be stored remotely on the network to which the mobile phone subscribes to. For remote network storage, the mobile phone establishes a connection with the network to access the theme profile.

Similarly, the content data associated with a theme can be stored locally on the mobile phone or on the network. If on the network, the mobile phone establishes a connection with the network to access and download the content data associated with a theme. Once theme data is downloaded it is then applied to the mobile phone.

Triggering events can be time based such that a theme transition occurs at a predetermined time. Or, a triggering event can be location based such that a theme transition occurs when the mobile phone approaches a predetermined location. If the triggering event is location based the mobile phone utilizes a location determination system (LDS) to determine when the mobile phone is approaching a predetermined location. One such location determination system is the global positioning satellite (GPS) system. Other LDSs can be used by those of ordinary skill in the art without affecting the scope of the present invention.

DETAILED DESCRIPTION

Figure 1:
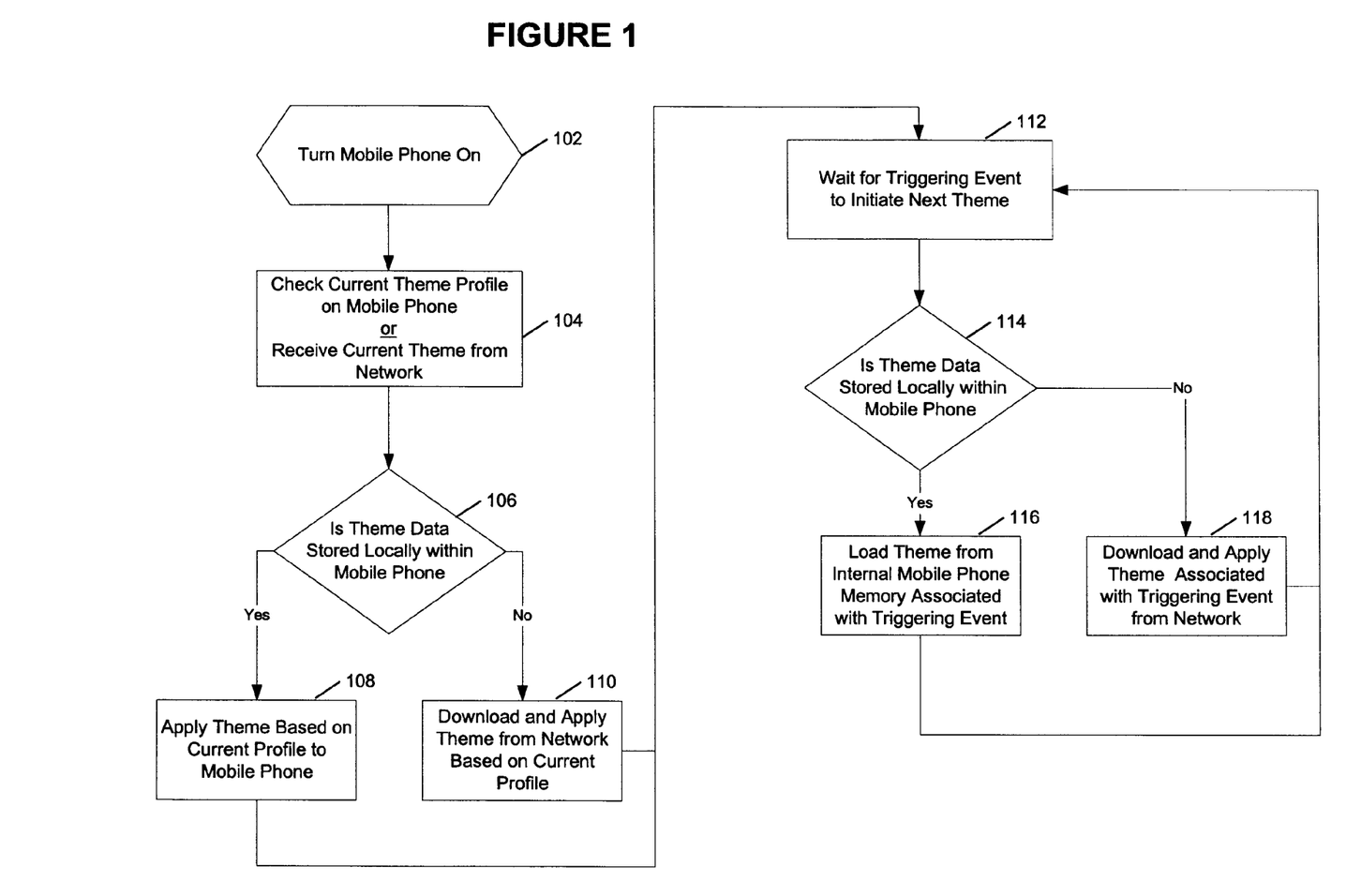
FIG. 1 is a flowchart illustrating how themes would be managed when the themes are stored within the mobile phone or reside on the cellular network.

FIG. 1 is a flowchart illustrating how themes would be managed when the themes are stored within the mobile phone or reside on the cellular network. When a mobile phone that supports dynamic theme management is powered on 102, one of the boot processes is to check the current theme profile 104 to determine which theme should currently be active. The determination of the current theme at power up depends on where the theme profile is maintained. If the theme profile is stored locally on the mobile phone, then it is incumbent upon the mobile phone to check the theme profile to determine which theme should be active. If the theme is stored on the network, then the network can push the currently active theme to the mobile phone as part of the network registration process that occurs each time a phone is powered on.

Once the current theme has been determined, a check is made 106 to see if the theme content data associated with the theme is stored locally on the mobile phone or if the theme data is to be retrieved from the mobile phone network. Locally stored theme data is executed and applied to the mobile phone 108 without having to communicate with the network. Theme data that is stored on the network is downloaded over a data connection between the mobile phone and the network before being executed and applied to the mobile phone 110.

Once a theme is active, the software that controls and manages themes for the mobile phone slips into a wait state 112. The wait state waits for a triggering event to signal a change in themes. When the triggering event occurs, the mobile phone again checks whether the new theme is locally stored or on the network 114. Locally stored themes associated with the triggering event are executed and applied to the mobile phone 116 directly while network themes are downloaded before being executed and applied to the mobile phone 118. The mobile phone then returns to the wait state 112 for the next triggering event to occur.

Figure 2A:
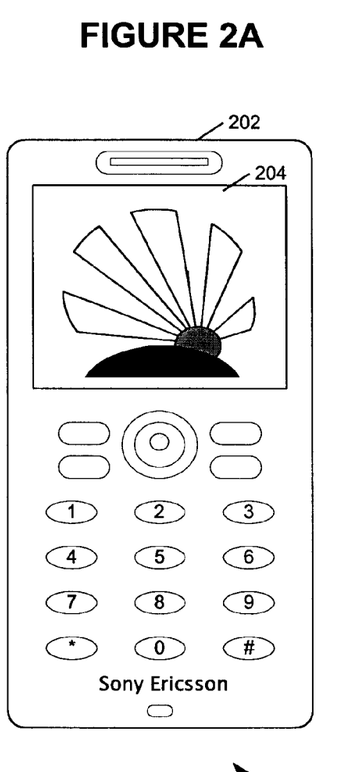
FIGS. 2A–2C illustrate a mobile phone as it changes themes based on a triggering event.
Figure 2B:
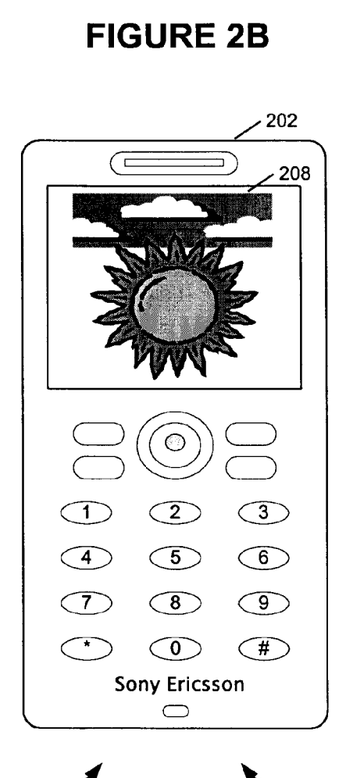
Figure 2C:
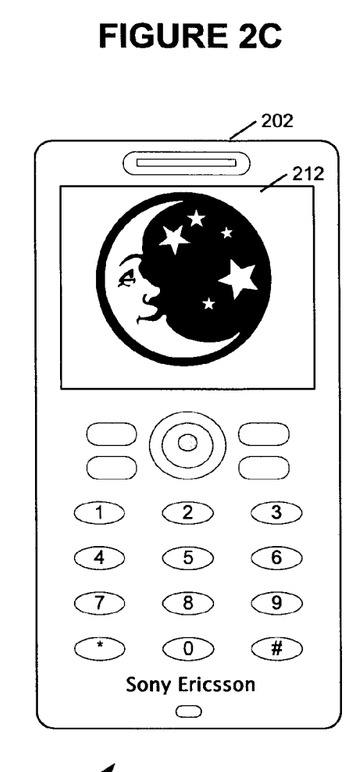

FIGS. 2A–2C illustrate a mobile phone as it changes themes based on a triggering event. In this example, the themes are triggered by the time of day. In the morning the mobile phone 202 displays an image of sunrise 204. At noon, the triggering event 206, the sunrise theme is replaced with an afternoon theme of sun and clouds 208. At 6:00 PM, another triggering event 210, the afternoon theme is replaced with an evening theme showing the moon and stars 212.

In addition, the themes can include more than just imagery on the mobile phone's display. Sounds and alerts can be customized to fit in with a theme. Different ring tones can be associated with the images to create a more robust theme. For instance, the morning theme can include a ring tone that plays revilee while the evening theme can include a ring tone that plays taps.

Figure 3A:
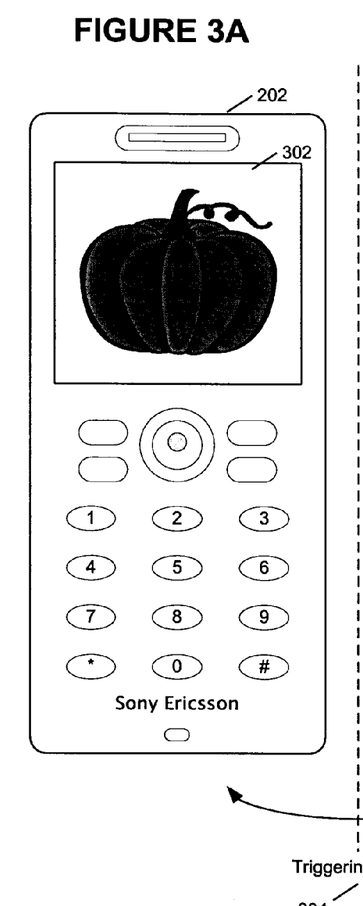
FIGS. 3A–3C illustrate another example of a mobile phone changing themes based on a triggering event.
Figure 3B:
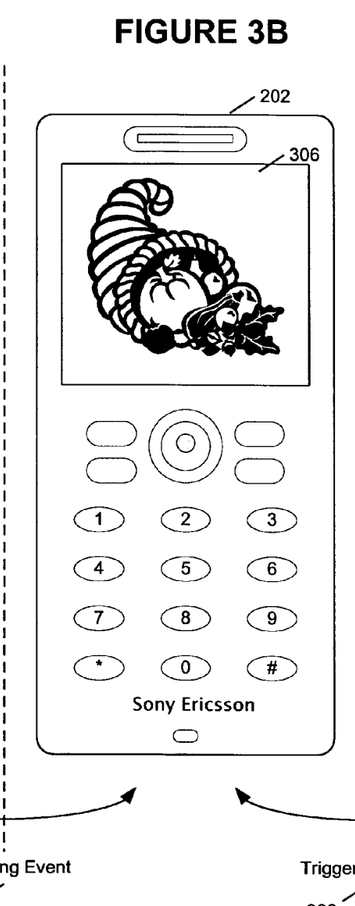
Figure 3C:
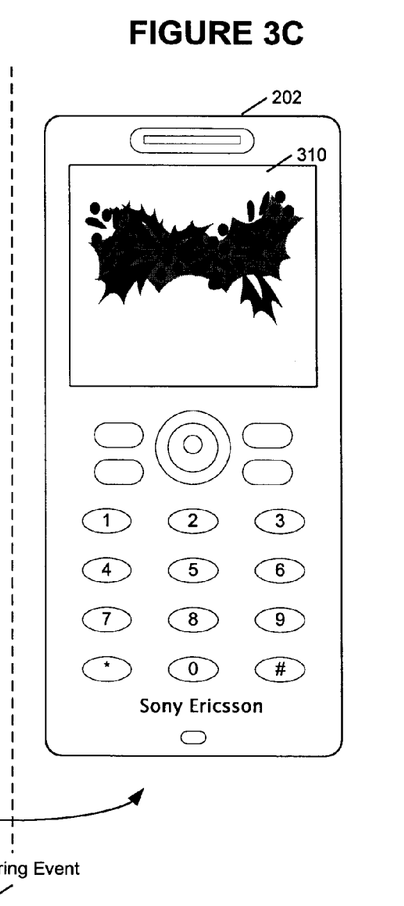

FIGS. 3A–3C illustrate another example of a mobile phone changing themes based on a triggering event. In this example, the themes are triggered by holiday seasons. The month of October can be set to a Halloween theme. The display could show a pumpkin 302 and the ring tone can be set to play Halloween music or scary sounds. Once the calendar hits November 1$^{st}$, the next theme is triggered 304. This event is easily detected by the mobile phone's internal clock/calendar. The Halloween theme is replaced with a Thanksgiving theme that displays a cornucopia 306. The next triggering event is December 1$^{st}$ 308 and the Thanksgiving theme is replaced with a Holiday theme. In this example, festive holiday flowers 310 are displayed. The ring tones can be set to play a variety of Holiday music.

Themes can overlap one another. When an overlap occurs, one theme will be given precedence over another based on the triggering event. A user can set general themes for seasons of the year and specific themes for holidays, vacations, business trips, sporting events, etc. . . . Moreover, themes can change from hour to hour within a day based on the events of that day.

Figure 4:
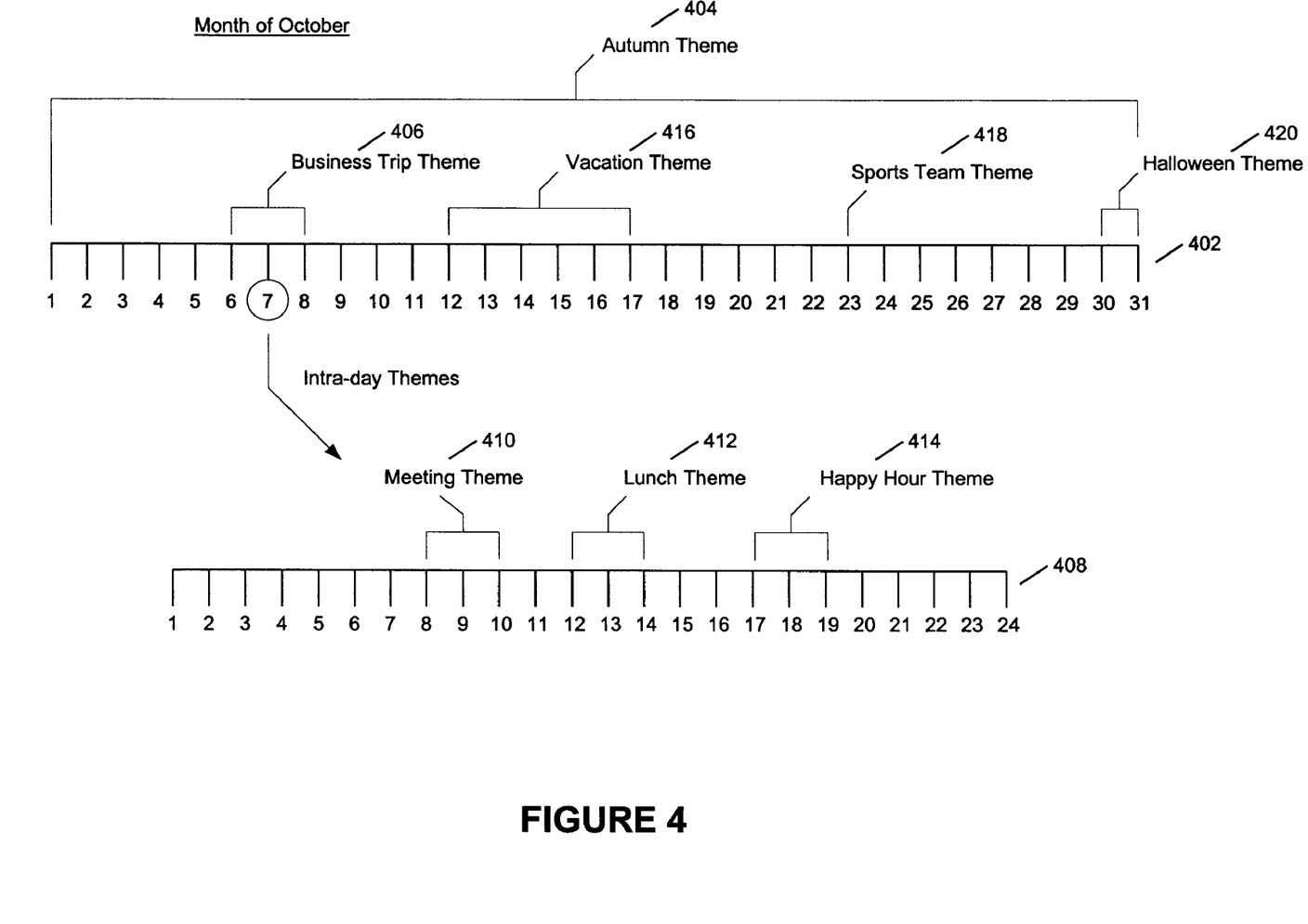
FIG. 4 illustrates a timeline that shows a hierarchy of themes throughout a month and throughout a particular day of the month.

FIG. 4 illustrates a timeline that shows a hierarchy of themes throughout a month and throughout a particular day of the month. In this example, a timeline for the month of October 402 is illustrated. The overall theme for the month of October is an autumn theme 404. The autumn theme 404 can display images associated with autumn such as leaves turning color on a tree. Within the month of October, several events are scheduled that will trigger a change of themes on the mobile phone. On October 6–8, the user has a business trip scheduled. When the mobile phone clock/calendar determines that it is October 6$^{th}$, the mobile phone will replace the autumn theme 404 with a business trip theme 406. The business trip theme can display icons such as a briefcase and airplane to signify work related travel. The ring tone can be set to sound more professional.

A second timeline 408 is illustrated for the day of October 7$^{th}$. The theme for the mobile phone remains a general business trip theme 406 until 8:00 AM. Between 8:00 and 10:00 AM the theme changes from the business trip theme to a meeting theme 410. Perhaps one of the most important aspects of the meeting theme 410 is to set the ring tone to silent. Once the meeting is complete, the theme is switched back to the previous business trip theme 406 until the next trigger. The next trigger occurs at noon and the theme is changed to a lunch theme. Once complete the lunch theme 412 again reverts to the business trip theme 406. The final theme for October 7$^{th}$ is triggered at 5:00 PM. It is a happy hour theme 414 that indicates a more festive relaxing mood. The mobile phone could display a martini glass or the like. Once happy hour is over, the theme reverts back to the business trip theme 406.

When the user returns from his business trip the mobile phone's theme will revert back to the autumn theme 404 that was in place prior to the trip. The next theme in October is triggered on October 12$^{th}$. This theme represents a vacation 416. This theme could include images of beaches and sounds like reggae music for the ring tones. Once the vacation is over, the autumn theme 404 is installed again. On October 23$^{rd}$, a special event theme is set to trigger. This theme centers on a sporting event 418 contested by the user's favorite team. It could be a college football game played by the user's alma mater. The theme could display the school logo or mascot and periodically play the school's fight song. The day after the big game the mobile phone switches themes back to the autumn theme 404.

The last theme in October is a holiday theme 420 for Halloween. The user may choose to set the last two days, in this example, to display Halloween images and emit scary sounds.

The hierarchy of themes shown in FIG. 4 are all time triggered. A theme profile within the mobile phone stores the triggering events and a pointer to the theme data associated with the triggering event. The pointer can either point to an internal memory location or to a network location where the theme data can be retrieved. Themes on the network require the mobile phone to establish a data connection with the network upon a triggering event. Once the data connection has been established, the theme data can be downloaded and applied to the mobile phone. When a time triggered theme has expired the mobile phone reverts back to the theme in place before the triggering event.

A triggering event need not be solely time based. Mobile phones equipped with location determination capabilities such as global positioning satellite (GPS) can trigger themes based on the location of the mobile phone. For instance, when the mobile phone is at or near the user's residence, the theme can be more relaxed and irreverent. When the mobile phone approaches and arrives at a user's place of work, the theme can become more professional.

Figure 5:
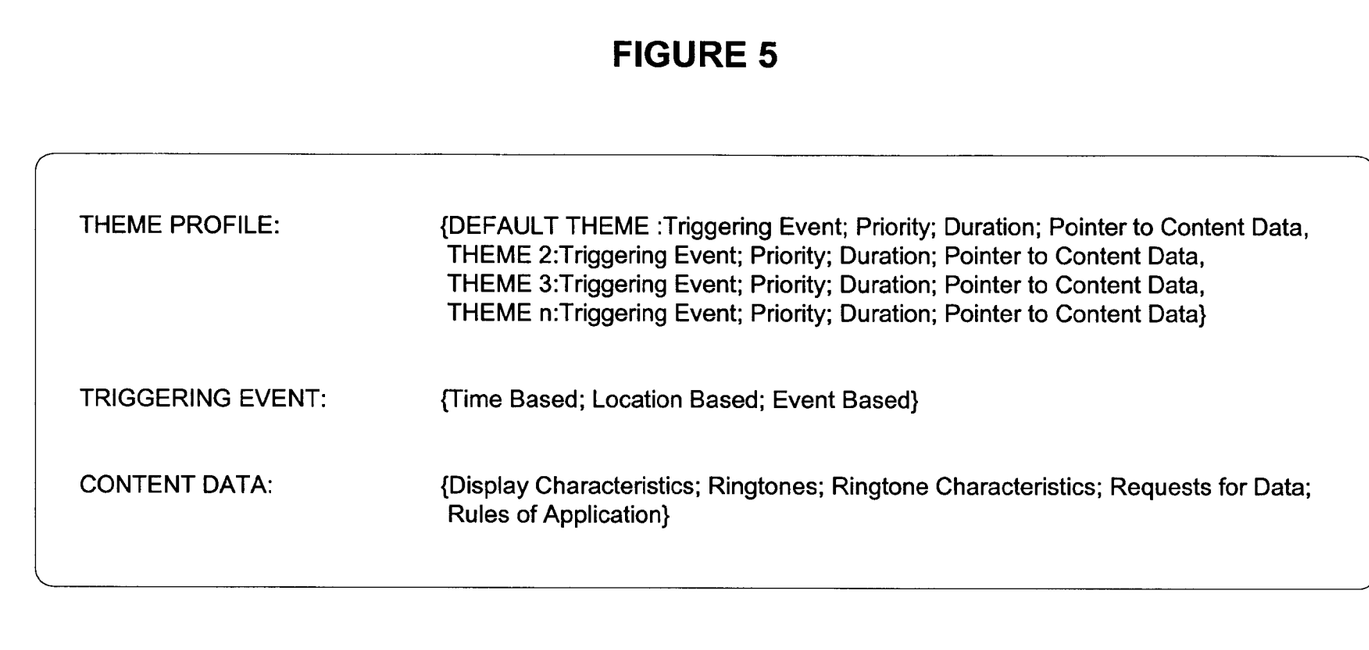
FIG. 5 illustrates the types of data that make up a theme profile, triggering event, and theme content.

FIG. 5 illustrates the types of data that make up a theme profile, triggering event, and theme content. Theme profiles are a collection of triggering events, data pointers, and priorities for sorting conflicts among triggering events. The priorities are especially important when a time trigger conflicts with a location trigger or a 3$^{rd}$ party push trigger. The theme profile is a set of data that identifies multiple themes and their triggering events. The mobile phone user has the ability to edit and set the parameters of the theme profile. The main parameters of the theme profile include the triggering event, a priority, a duration for the theme, and a pointer to the theme content to be applied to the mobile phone.

A triggering event can be time based, location based, or event based. Time based triggering events trigger a theme transition at a specific time. Location based triggering events trigger a theme transition when the mobile phone approaches a predetermined location. Event based triggering events trigger a theme transition when the mobile phone senses or is informed of a specific event. For instance, an event based triggering event could occur when the mobile phone (and user) enter a restaurant. The restaurant could broadcast, via Bluetooth™, for instance, a theme for the restaurant that included various background displays and restaurant offerings like the day's specials.

Event based triggering events can become annoying to the mobile phone user if everywhere the user goes, that location wants to push a theme to the mobile phone. Thus, the mobile phone user can opt out of event based themes or can set the mobile phone to query each time an event based theme is detected.

The priority parameter governs the application of themes having conflicting triggers. A theme can be given a priority value on a scale of 1 to 10, for instance. The lower the number, the higher the priority. Then, when two or more themes have triggering events that conflict, the them with the highest priority will get applied to the phone. This scenario can occur when a time based triggering event conflicts with a location based triggering event. An event based triggering event can also occur that would conflict with another theme. On the scale in the in the example above, up to 10 different themes can conflict and be resolved. One of ordinary skill in the art, however, could readily devise an alternative priority conflict resolution system without departing from the spirit or scope of the present invention.

The duration parameter for a theme is an optional parameter. It allows the user to set an expiration period for a particular theme. After a certain period of time the theme can transition back to the previous theme or to a default theme. The other setting for the duration parameter can indicate that the current theme will remain until a new theme is requested or the next triggering event occurs.

The pointer to the theme content data tells the mobile phone where to obtain the theme data to be applied to the mobile phone. The content data itself is a collection of display characteristics, ringtones, ringtone settings (e.g., volume, silent, vibrate), requests for specific data, and rules for applying the content to the mobile phone. When an theme is triggered, the mobile phone determines the location of the content data and retrieves same. The rules dictate how the display shall appear and how the ringtones shall sound.

The rules can also act as subtriggers in that they can cause the retrieval of updated information to display on the phone. For instance, if the theme is business related and one of the content items is a stock quote, the rules can tell the mobile phone to obtain and display an updated stock quote every 15 minutes. Or, if the theme is a weather theme, the rules can tell the mobile phone to obtain and display an updated weather radar map.

The rules can also cause display characteristics to change based on sub-triggers. Consider a theme broadly characterized as a time of day theme. The rules could indicate that the display image should change from a picture of the sun to a picture of a moon after 8:00 PM.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

The invention claimed is:

1. A method of managing themes applicable to a mobile phone wherein themes provide the mobile phone with changeable characteristics pertaining to the appearance and sound presented by the mobile phone, said method comprising:
   checking a theme profile associated with the mobile phone to determine which theme is currently active, wherein the theme profile includes data pertaining to triggering events that cause the mobile phone to transition from one theme to another theme, a priority setting that determines which theme shall be applied to the mobile phone in the event of conflicting triggering events, and pointers to where the content data associated with a theme is located;
   waiting for a triggering event to occur to cause a transition from the currently active theme to a new theme; and
   applying the new theme based on an associated triggering event.

2. The method of claim 1 wherein a triggering event is time based such that a theme transition occurs at a predetermined time.

3. The method of claim 1 wherein a triggering event is location based such that a theme transition occurs when the mobile phone approaches a predetermined location.

4. The method of claim 3 wherein the mobile phone utilizes a location determination system to determine when the mobile phone is approaching predetermined location.

5. The method of claim 1 wherein the theme profile associated with the mobile phone is stored locally on the mobile phone.

6. The method of claim 1 wherein the content data associated with a theme is stored locally on the mobile phone.

7. The method of claim 1 wherein the content data associated with a theme is stored remotely on the network to which the mobile phone subscribes to and the mobile phone establishes a connection with the network to access and download the content data associated with a theme.

8. A method of managing themes applicable to a mobile phone wherein themes provide the mobile phone with changeable characteristics pertaining to the appearance and sound presented by the mobile phone, and wherein a theme profile associated with the mobile phone is stored remotely on the network to which the mobile phone subscribes to, wherein the theme profile includes data pertaining to triggering events that cause the mobile phone to transition from one theme to another theme, a priority setting that determines which theme shall be applied to the mobile phone in the event of conflicting triggering events, and pointers to where the content data associated with a theme is located, said method comprising:
   receiving current theme data upon network registration when the phone is powered on based on the associated stored theme profile;
   applying the current theme to the mobile phone;
   waiting for a triggering event to occur to cause a transition from the current theme to a new theme; and
   applying the new theme based on an associated triggering event.

9. The method of claim 8 wherein the content data associated with a theme is stored locally on the mobile phone.

10. The method of claim 8 wherein the content data associated with a theme is stored remotely on the network to which the mobile phone subscribes to and the mobile phone establishes a connection with the network to access and download the content data associated with a theme.

11. The method of claim 8 wherein a triggering event is time based such that a theme transition occurs at a predetermined time.

12. The method of claim 8 wherein a triggering event is location based such that a theme transition occurs when the mobile phone approaches a predetermined location.

13. The method of claim 12 wherein the mobile phone utilizes a location determination system to determine when the mobile phone is approaching a predetermined location.

14. A computer program product for managing themes applicable to a mobile phone wherein themes provide the mobile phone with changeable characteristics pertaining to the appearance and sound presented by the mobile phone, the computer program product comprising:
    computer program code for checking a theme profile associated with the mobile phone to determine which theme is currently active, wherein the theme profile includes data pertaining to triggering events that cause the mobile phone to transition from one theme to another theme, a priority setting that determines which theme shall be applied to the mobile phone in the event of conflicting triggering events, and pointers to where the content data associated with a theme is located;
    computer program code for waiting for a triggering event to occur to cause a transition from the currently active theme to a new theme; and
    computer program code for applying the new theme based on an associated triggering event.

15. The computer program product of claim 14 wherein a triggering event is time based such that a theme transition occurs at a predetermined time.

16. The computer program product of claim 14 wherein a triggering event is location based such that a theme transition occurs when the mobile phone approaches a predetermined location.

17. The computer program product of claim 16 wherein the mobile phone utilizes a location determination system in conjunction with computer program code to determine when the mobile phone is approaching a predetermined location.

18. The computer program product of claim 14 wherein the theme profile associated with the mobile phone is stored locally on the mobile phone.

19. The computer program product of claim 14 wherein the content tent data associated with a theme is stored locally on the mobile phone.

20. The computer program product of claim 14 wherein the content data associated with a theme is stored remotely on the network to which the mobile phone subscribes to and the mobile phone includes computer program code for establishing a connection with the network to access and download the content data associated with a theme.

21. A computer program product for managing themes applicable to a mobile phone wherein themes provide the mobile phone with changeable characteristics pertaining to the appearance and sound presented by the mobile phone, and wherein a theme profile associated with the mobile phone is stored remotely on the network to which the mobile phone subscribes to, wherein the theme profile includes data pertaining to triggering events that cause the mobile phone to transition from one theme to another theme, a priority setting that determines which theme shall be applied to the mobile phone in the event of conflicting triggering events, and pointers to where the content data associated with a theme is located, the computer program product comprising:
    computer program code for receiving current theme data upon network registration when the phone is powered on based on the associated stored theme profile;
    computer program code for applying the current theme to the mobile phone;
    computer program code for waiting for a triggering event to occur to cause a transition from the current theme to a new theme; and
    computer program code for applying the new theme based on an associated triggering event.

22. The computer program product of claim 21 wherein the content data associated with a theme is stored locally on the mobile phone.

23. The computer program product of claim 21 wherein the content data associated with a theme is stored remotely on the network to which the mobile phone subscribes to and the mobile phone establishes a connection with the network to access and download the content data associated with a theme.

24. The computer program product of claim 21 wherein a triggering event is time based such that a theme transition occurs at a predetermined time.

25. The computer program product of claim 21 wherein a triggering event is location based such that a theme transition occurs when the mobile phone approaches a predetermined location.

26. The computer program product of claim 25 wherein the mobile phone utilizes a location determination system to determine when the mobile phone is approaching a predetermined location.

27. A system for managing themes applicable to a mobile phone wherein themes provide the mobile phone with changeable characteristics pertaining to the appearance and sound presented by the mobile phone, the system comprising:
    means for checking a theme profile associated with the mobile phone to determine which theme is currently active, wherein the theme profile includes data pertaining to triggering events that cause the mobile phone to transition from one theme to another theme, a priority setting that determines which theme shall be applied to the mobile phone in the event of conflicting triggering events, and pointers to where the content data associated with a theme is located;
    means for waiting for a triggering event to occur to cause a transition from the currently active theme to a new theme; and
    means for applying the new theme based on an associated triggering event.

28. The system of claim 27 wherein a triggering event is time based such that a theme transition occurs at a predetermined time.

29. The system of claim 27 wherein a triggering event is location based such that a theme transition occurs when the mobile phone approaches a predetermined location.

30. The system of claim 29 wherein the mobile phone utilizes a location determination system in conjunction with means for determining when the mobile phone is approaching a predetermined location.

31. The system of claim 27 wherein the theme profile associated with the mobile phone is stored locally on the mobile phone.

32. The system of claim 27 wherein the content data associated with a theme is stored locally on the mobile phone.

33. The system of claim 27 wherein the content data associated with a theme is stored remotely on the network to which the mobile phone subscribes to and the mobile phone includes computer program code for establishing a connection with the network work to access and download the content data associated with a theme.

34. A system for managing themes applicable to a mobile phone wherein themes provide the mobile phone with changeable characteristics pertaining to the appearance and sound presented by the mobile phone, and wherein a theme profile associated with the mobile phone is stored remotely on the network to which the mobile phone subscribes to, wherein the theme profile includes data pertaining to triggering events that cause the mobile phone to transition from one theme to another theme, a priority setting that determines which theme shall be applied to the mobile phone in the event of conflicting triggering events, and pointers to where the content data associated with a theme is located, the computer program product comprising:

means for receiving current theme data upon network registration when the phone is powered on based on the associated stored theme profile;

means for applying the current theme to the mobile phone;

means for waiting for a triggering event to occur to cause a transition from the current theme to a new theme; and means for applying the new theme based on an associated triggering event.

35. The system of claim 34 wherein the content data associated with a theme is stored locally on the mobile phone.

36. The system of claim 34 wherein the content data associated with a theme is stored remotely on the network to which the mobile phone subscribes to and the mobile phone establishes a connection with the network to access and download the content data associated with a theme.

37. The system of claim 34 wherein a triggering event is time based such that a theme transition occurs at a predetermined time.

38. The system of claim 34 wherein a triggering event is location based such that a theme transition occurs when the mobile phone approaches a predetermined location.

39. The system of claim 38 wherein the mobile phone utilizes a location determination system to determine when the mobile phone is approaching a predetermined location.

* * * * *